United States Patent
Kalinsky

[11] Patent Number: 6,050,162
[45] Date of Patent: Apr. 18, 2000

[54] MULTI-SPINDLE MACHINE RETROFIT SYSTEM

[75] Inventor: Robert Kalinsky, Broadview Heights, Ohio

[73] Assignee: Logan Clutch Corporation, Westlake, Ohio

[21] Appl. No.: 08/871,019

[22] Filed: Jun. 6, 1997

Related U.S. Application Data

[60] Provisional application No. 60/019,272, Jun. 7, 1996.

[51] Int. Cl.[7] .......................................................... B23B 3/34
[52] U.S. Cl. ............................ 82/129; 29/37 A; 29/27 R; 74/335; 192/48.8
[58] Field of Search ................................ 82/129; 29/37 R, 29/37 A, 38 R, 38 A, 38 B, 27 R; 192/48.8, 12 R, 48.9; 74/336 R, 335; 477/124

[56] References Cited

U.S. PATENT DOCUMENTS

| 3,081,523 | 3/1963 | Retz | 29/38 |
|---|---|---|---|
| 3,760,661 | 9/1973 | Eichanhofer | 82/2.7 |
| 3,982,618 | 9/1976 | Horsch | 192/18 A |
| 4,644,819 | 2/1987 | Zugel | 82/28 R |
| 5,150,637 | 9/1992 | Ninomiya et al. | 74/335 |
| 5,193,422 | 3/1993 | Mukai | 82/129 |
| 5,473,959 | 12/1995 | Lasoen | 74/335 |
| 5,730,037 | 3/1998 | Manning | 82/118 |

*Primary Examiner*—Andrea L. Pitts
*Assistant Examiner*—Adesh Bhargana
*Attorney, Agent, or Firm*—David R. Percio; Ralph E. Jocke

[57] ABSTRACT

A retrofit system for a multi-spindle machine which includes a brake clutch (72), a feed clutch (70), and a high speed clutch (68) which are incorporated into the drive train gear layout of the multi-spindle machine. All three clutches are controlled by an electrical control circuit which includes a timer (80). When the multi-spindle machine shifts from high speed to low speed the control system activates the brake clutch for a short time period set in the timer, which causes the drive train gears to quickly slow down, allowing synchronous meshing with the low speed drive train of the multi-spindle machine and enabling a reduction in machine cycle time.

20 Claims, 5 Drawing Sheets

MULTI-SPINDLE MACHINE RETROFIT SYSTEM

This application claims the benefit of U.S. Provisional Application No. 60/019,272 filed Jun. 7, 1996.

TECHNICAL FIELD

This invention relates to multi-spindle machines. Specifically, this invention relates to a retrofit system for multi-spindle machines which utilizes a timer mechanism to reduce the cycle time of the multi-spindle machine.

BACKGROUND ART

Multi-spindle machines are known in the prior art. Multi-spindle machines are used to mass produce standardized types of components. A multi-spindle machine typically has several workstations at which machining operations are performed. A piece of raw stock, such as bar stock, enters the machine at a first station and as the machine indexes, various machining operations are performed. Once this station is indexed completely through the machine, a completed part is formed. The part is released, and the process is repeated for that station with a new piece of raw stock. An advantage of multi-spindle machines is that all stations in the machine are producing parts simultaneously, resulting in high production.

Multi-spindle machines typically have a large indexing drum with four, six or eight stations thereon, Each of the stations carries a workpiece. In all but one of the stations, where a new piece of stock enters, a machining operation is performed. After each operation is completed, the drum is rotated so that each workpiece moves sequentially through the location where the various operations are performed. Machining operations typically performed at a multi-spindle machine include turning and threading.

Most multi-spindle machines are very efficient in terms of producing standardized parts at a high rate. They also have drawbacks. A primary drawback associated with multi-spindle machines is that the entire machine often operates off of a single main motor. The main motor simultaneously drives all of the devices in the machine. Multi-spindle machines typically include a timing shaft for the coordination of multiple machine operations. The operator of the machine is still required to set up the cams operating off the timing shaft which is a very time consuming activity.

The speed of multi-spindle machines typically changes from high to low speed and back again during the course of their operating cycle. High speed is typically used for times in the machine cycle when critical machining operations are not occurring. High speed operation is desirable when the stations are indexing or when the tools are moving toward or away from the work pieces and are not performing work thereon. Low speed operation is used when the tools in the machine are forming the metal. Any attempt to operate the machine at high speed when such forming work is being performed is likely to cause a problem or jam up the machine.

It is the responsibility of the operator or set-up technician to properly set the points in the machine cycle where the machine makes its high speed and low speed shifts. Shifting from high to low speed too early may result in slower cycle times and production rates. The same results may occur if the shift from low to high speed is made too late in the machine cycle. However as previously discussed, if the shift from high to low speed is made too late (or the shift from low to high too early) damage to the machine, the tooling or the workpiece may result.

Another disadvantage of past machine systems is the time lag in the cycle when the machine shifts from high speed to low speed. This time lag is due to the momentum of the gears traveling at the high speed. FIG. 1 shows a cross sectional view of a power feed train and gear layout for a National Acme 7/16 RA6 multi-spindle machine. Referring now to FIG. 1 for illustration of this time lag, there is shown a power feed train and gear layout generally indicated 10. The power feed train consists of a main motor and main motor sprocket (not shown) which engages and drives a main motor pulley 12. The main motor pulley 12 engages a sprocket on a pulley shaft 14. This pulley shaft acts to drive the entire gear train of the multi-spindle machine.

The pulley shaft 14 drives both a high speed drive train and a low speed drive train. Both the high speed and low speed drive trains selectively act to drive the main drum shaft 16 of the machine. The main drum shaft is part of a power drive tin which drives the part forming components of the machine. The low speed drive train consists of a plurality of reducing gear couples which act to substantially reduce rotational speed from that of the pulley shaft 14. The pulley shaft 14 first engages a spindle speed drive gear 20. Spindle speed drive gear 20 propels a meshing spindle speed change gear 22. The spindle speed change gear 22 drives a spindle change gear shaft 24 which also engages a range drive gear 26. The range drive gear meshes with and propels a range gear 28. The range gear 28 drives a second range drive gear 30. The second range drive gear is driven by range gear 28 through a spindle drive shaft 32. Second range drive gear 30 is coupled to a second range gear 34 which drives a feed change gear shaft 36. Feed change gear shaft 36 drives the last speed reducing couple which consists of feed change drive gear 38 and feed change gear 40. The feed change gear 40 drives a small worm shaft 18. The small worm shaft drives a small worm gear 42 which drives a constant speed shaft 50 through a gear 43. The shaft 50 drives the main drum shaft 16 at the low speed, through a large worm drive gear 48 and large worm shaft 54.

The pulley shaft 14 may also selectively transmit power to the main drum 16 shaft through the high speed drive train. The high speed drive train includes drive gear 44 which engages high speed bevel gear 46. The high speed bevel gear 46 drives large worm shaft drive gear 48 through shaft 50. The large worm shaft drive gear 48 is coupled with large worm shaft driven gear 52. Gear 52 drives large worm shaft 54 which drives the main drum shaft worm gear 56. Worm gear 56 turns the main drum shaft 16.

As discussed above, either the low speed drive train or the high speed drive train propels the power drive train at any one time. This is accomplished by having the low speed drive train always operating while the high speed drive train is selectively engaged. When the low speed drive train is selected to drive the main drum shaft, the high speed drive gear 44 is operatively disengaged from the pulley shaft by a high-low speed disc clutch 58. When the high-low speed disc clutch is disengaged, the high speed drive gear 44 is free to rotate independent of the pulley shaft 14. As the low speed drive train drives the small worm gear 42, the constant speed shaft 50 turns the large worm shaft drive gear 48. The rotational speed of the small worm gear 42 determines the speed of the main drum shaft 16.

When the main drum shaft is desired to be rotated at a high speed, the high-low speed disc clutch 58 is engaged allowing the pulley shaft 14 to drive the high speed drive gear 44. The large worm shaft drive gear 48 is then driven by high speed bevel gear 46 through the constant speed shaft 50, to drive the power drive train. During the high speed rotation a roll clutch 60 enables overrunning by shaft 50 of gear 43. The roll clutch 60 allows the constant speed shaft 50 to rotate at a higher speed than the speed imparted to gear 43 rotating small worm gear 42. The roll clutch is a conventional overrunning clutch and permits freewheeling of the constant speed shaft in excess of the speed imparted to gear 43 relative the small worm gear 42.

Large worm shaft 54 in the power drive train can be operatively disconnected from the large worm shaft driven gear 52 by feed disc clutch 62. Feed disc clutch 62 allows for the freewheeling of the large worm shaft 54 when the clutch 62 is disengaged. One situation in which the large worm shaft is disconnected from the large worm shaft driven gear is when the large worm shaft is stopped by a brake 64. The brake 64 conventionally acts to stop the main drum shaft 16 in cases of emergency. In the prior art the brake 64 consists of a typical band brake.

The problem of increased cycle times that result from untimely shifting from high to low speed is inherent in the operation of the power feed train and gear layout 10. As discussed above, in high speed operation the high-low speed disc clutch 58 is engaged with the pulley shaft 14. Shaft 14 drives the constant speed shaft 50 and the large worm shaft drive gear 48 from the relatively high speed of the pulley shaft 14. During high speed rotation of the constant speed shaft 50, the roll clutch 60 operatively disengages the constant speed shaft from the small worm gear 42 by overrunning. During high speed operation gears 42 and 43 rotate at the lower relative speed of the low speed drive train.

When it is desired to shift back into low speed the roll clutch 60 must be operatively re-engaged to allow the small worm gear 42 to transfer power to the large worm shaft drive gear 48. At the same time the low speed disc clutch 58 is disengaged to allow shaft 50 to slow down until the low speed drive train takes over. In this prior art power feed train and gear layout 10, a time lag is necessary to allow tie drum shaft 16 and all of the connected components to slow down before moving in powered condition at the lower speed. When the low speed drive train is engaged the inertia of the normally driven gears tends to overcome the lash of the normally driving gears. This pull increases wear on the gears leading to reduced life.

Undesirably long machine cycle times also result because the forming of parts cannot occur until the machine is being driven at low speed. As a result, the high-low speed clutch 58 must disengage early enough in the cycle to allow the inertia to dissipate before metal working operations begin.

Thus, there exists a need for a control system for a multi-spindle machine that decreases the cycle time, minimizes wear on the drive train gears and enables the more effective operation of a multi-spindle machine.

DISCLOSURE OF INVENTION

It is an object of the present invention to produce a multi-spindle machine retrofit system that includes a control system that optimizes machine performance.

It is a further object of the present invention to provide a multi-spindle machine retrofit system that lowers cycle times thus increasing production of the multi-spindle machine.

It is a further object of the present invention to provide a multi-spindle machine retrofit kit which reduces wear on the parts of the multi-spindle machine.

It is a further object of the present invention to provide a multi-spindle machine retrofit kit which is adaptable to many different types of multi-spindle machines and tooling set-ups.

Further objects of the present invention will be made apparent following the Best Modes for Carrying Out Invention and the appended claims.

The foregoing objects of the present invention are accomplished by a retrofit system for a multi-spindle machine. The multi-spindle machine includes a low speed drive train and a high speed drive train which drive the components of the multi-spindle machine at separate times. Both the low speed drive train and the high speed drive train are driven by a main motor, and drive the machine components through a common power drive train.

The retrofit system includes a brake clutch, a feed clutch, and a high speed clutch. The three clutches are incorporated into the drive train gear layout of the multi-spindle machine. All three clutches are pneumatically actuated and electronically controlled. The high speed clutch selectively engages the high speed gear train with the power drive train. When the high speed clutch is engaged the multi-spindle machine operates at high speed. When the high speed clutch is disengaged, the multi-spindle machine operates at low speed.

The feed clutch of the present invention engages the power drive train to a shaft which is selectively driven by either the low or high speed drive trains. The feed clutch acts to selectively engage the power drive train.

The brake clutch of the present invention is positioned in operative connection with the power drive train. The brake clutch acts to selectively slow the rotation of the power drive train components. The brake clutch can be applied for short periods whereby it acts to reduce the speed of rotation of the power drive train components. The brake clutch can also be applied for longer periods whereby it acts to stop the rotation of the power drive train.

All three clutches are controlled by an electrical control system which includes a timer and a limit switch. The limit switch is positioned on the multi-spindle machine to interact with a timing shaft of the multi-spindle machine. The limit switch is positioned in operative connection with the timing shaft which causes the machine to shift from high speed operation to low speed operation.

The timer is operative to store a time value which is counted down when the timer is energized. The timer is connected within the electrical control system to control the time period for the application of the brake clutch on the power drive train. The timer automatically resets when it has counted down the desired time value.

When it is desired to shift the multi-spindle machine from high speed to low speed, the control system receives a signal from the limit switch. The limit switch signal is used by the control system to deactivate the high speed clutch which disconnects the high speed drive train from the power drive train. When the high speed clutch is deactivated, the timer is energized. The control system then simultaneously activates the brake clutch and deactivates the feed clutch for the prespecified time value stored in the timer. The deactivation of the feed clutch disengages the power drive train from the high and low speed drive rains. The application of the brake clutch slows the power drive train to a speed synchronous with the low speed drive train. At the end of the prespecified time value the feed clutch is engaged at the same time that the brake clutch is deactivated. This allows the power drive train gears to mesh at a synchronous speed with the low speed drive train of the multi-spindle machine.

Specifically the retrofit system of the present invention is adapted for incorporation into a multiple spindle machine. The multiple spindle machine typically includes: a motor; a first gear, operatively driven by the motor at either a low speed by a low speed drive train or a high speed by a high speed drive train; a second gear, wherein the second gear is rotated by the first gear; a shaft, wherein the shaft is rotated by the second gear, wherein all or most of the machining components of the multiple spindle machine are operatively driven by said shaft. Of course as is well known in the art, the multiple spindle machine also includes a timing shaft which acts to synchronize the sequential operations of the multiple spindle machine. All or most operations of the multiple spindle machine are operated in coordination with a corresponding rotational position of the timing shaft.

The retrofit system of the present invention includes: a high speed clutch operative to selectively connect said motor to the high speed drive train, whereby when the high speed clutch is engaged the motor drives the high speed drive train which operates to rotate the first gear; a feed clutch operative to selectively connect the shaft to the second gear, whereby when the feed clutch is engaged the shaft is driven by the second gear, whereby when the feed clutch is disengaged the shaft does not receive power from the second gear, a brake clutch, wherein the brake clutch is operative to slow the speed of the shaft; and a timer, wherein the timer is operative to count down a preset time interval; wherein the preset time interval represents the time the brake clutch is engaged when the machining components are switched from the high speed to the low speed. When the machining components are to be operated at a high speed, the high speed clutch and the feed clutch are engaged. When the machining components speed is to be switched from the high speed to a low speed, the high speed clutch is disengaged, the feed clutch is disengaged for a period of time corresponding to the time interval, while the brake clutch is engaged to bring the rotational speed of the shaft from the high speed to the low speed.

The retrofit system can be integrated into a multiple spindle machine in order to reduce the wear on the gears of the multiple spindle machine. This integration includes the steps of: installing the high speed clutch into the multiple spindle machine in operative connection with the motor and the high speed drive train, whereby when the high speed clutch is engaged the motor drives the high speed drive train which operates to rotate the first gear; installing the feed clutch into the multiple spindle machine in operative connection with the shaft and the second gear, wherein the feed clutch is operative to selectively connect the shaft to the second gear, whereby when the feed clutch is engaged the shaft is driven by the second gear, whereby when the feed clutch is disengaged the shaft does not receive power from the second gear; and installing the brake clutch into the multiple spindle machine in operative connection with the shaft.

In the operation of the multiple spindle machine with the integrated retrofit system the timer's count down is initiated when the timing shaft reaches a predetermined rotational position, wherein the predetermined rotational position corresponds to a time where said machining components are to be switched from the high speed to the low speed. The high speed clutch and the feed clutch are disengaged when the timing shaft reaches the predetermined rotational position. The brake clutch is engaged when said timing shaft reaches the predetermined rotational position for the preset time interval. And finally the feed clutch is reengaged after the preset time interval, whereby the machining components are operated at the low speed.

BEST MODES FOR CARRYING OUT INVENTION

Figure 1:
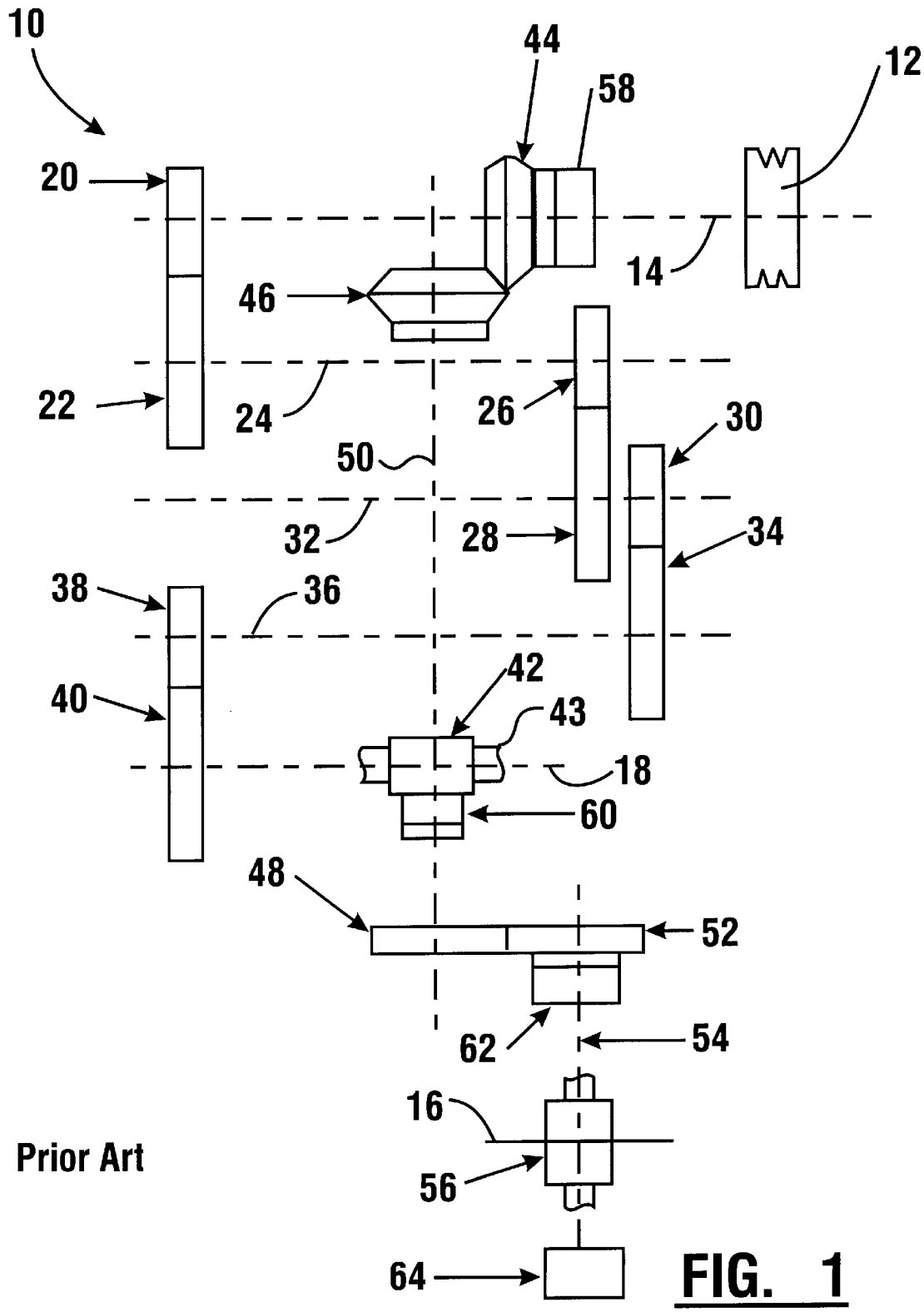
FIG. 1 shows a cross sectional view of a power feed train and gear layout for a prior art multi-spindle machine.
Figure 2:
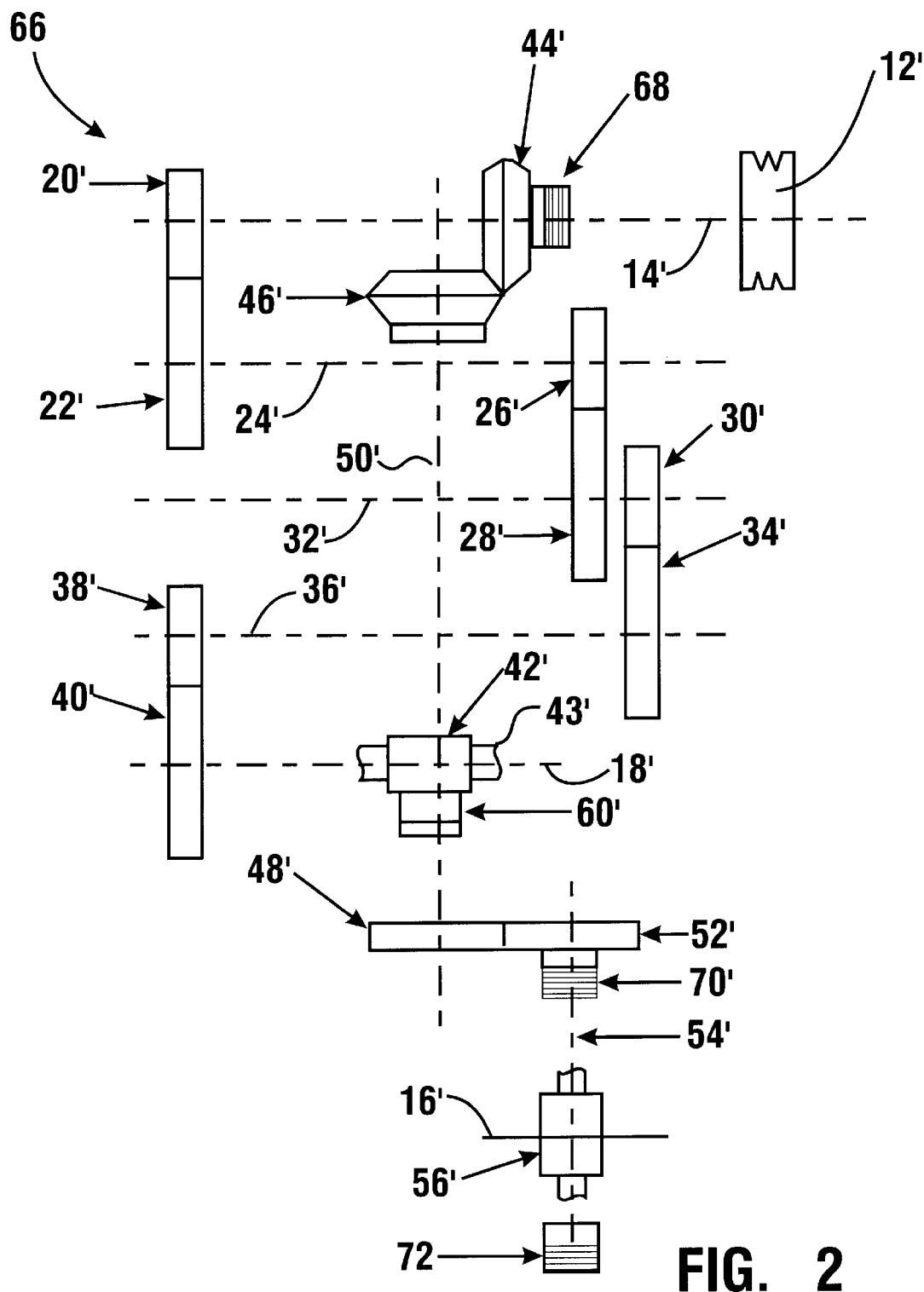
FIG. 2 shows a cross-sectional view of a power feed train and gear layout incorporating an exemplary embodiment of a retrofit system of the present invention.

Referring now to FIG. 2, there is shown therein a cross section of a power feed train and gear layout 66 incorporating the preferred embodiment of the retrofit system of the present invention. The brand of machine on which the retrofit system is shown is the same as described with the power feed train and gear layout 10 shown in FIG. 1. In FIG. 2 the components of power feed train and gear layout 10 shown as prime numbers. The high-low speed disc clutch shown in FIG. 1 is replaced in the present invention with a high speed clutch 68 shown in FIG. 2. The feed clutch 62 in FIG. 1 is replaced by a feed clutch 70 and brake 64 has been replaced by a brake clutch 72. The high-speed clutch 68, feed clutch 70 and brake clutch 72 are components of the retrofit system which will be more fully described below. The high-speed clutch, feed clutch and the brake clutch are all pneumatically operated and the solenoid valves which supply the air to these clutches are electrically actuated. Therefore, these components can be controlled independent of the machine cams on which the timing of all other machine component operations are dependent.

The high speed clutch 68 is a pneumatically operated multi-disc friction clutch which is positioned on the pulley shaft 14' in connection with the high speed drive gear 44'. The high speed clutch acts to engage the high speed drive train by selectively engaging the pulley shaft 14' to the gear 44'. The high speed clutch 68 engages gear 44' with pulley shaft 14' when the main drum shaft 16' is to be driven at high speed and disengages from the pulley shaft 14' when the main drum shaft is to be driven at the low speed.

The feed clutch 70 is also a pneumatically operated multi-disc friction clutch. Clutch 70 is positioned on the large worm shaft 54'. It is selectively actuated to engage shaft 54' with the large worm shaft driven gear 52'. The feed clutch 70 allows the large worm shaft driven gear 52' to selectively and instantaneously disengage from the large worm shaft 54'. As the large worm shaft driven gear 52' acts to link the large worm shaft to the high speed and low speed drive trains, disengagement of the feed clutch 70' allows the large worm shaft 54' to freewheel.

The brake clutch 72 is a pneumatically operated multi-disc friction clutch. It is positioned on the large worm shaft 54' and is selectively engaged to control the speed of the main drum shaft 16'. The brake clutch 72, because it is pneumatically operated, can be selectively engaged for short time periods to achieve quick deceleration of the large worm shaft 54' from a high speed to a low speed. This is done in the preferred form of the invention to synchronize speed before the low speed drive train is engaged with the large worm shaft drive gear 48'.

Figure 3:
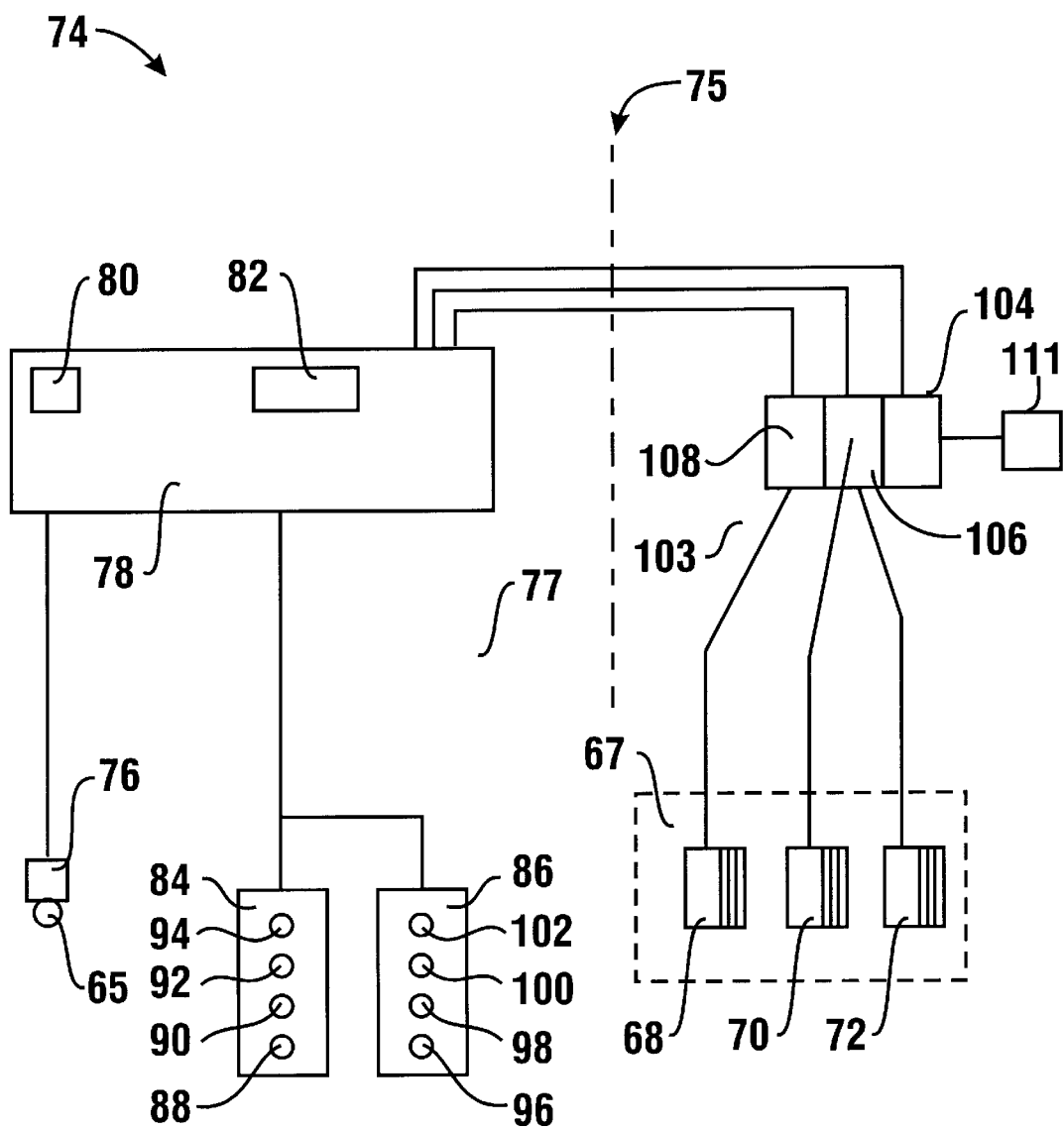
FIG. 3 shows a retrofit system of the present invention.

Referring now to FIG. 3, there is shown the retrofit system 74 of the present invention. The retrofit system consists of control system 75 including an electrical package 77, a solenoid package 103 and a mechanical package 67. The electrical system includes a limit switch 76. The limit switch is mounted within the multi-spindle machine adjacent the timing shaft 65. The limit switch 76 is actuated by a cam connected to the timing shaft. The cam is adjusted during the set up of the machine to cause the cam to actuate the limit switch when the machine is to shift from high to low speeds. In the preferred embodiment of the machine the limit switch is an Omron limit switch, Model Number D4CC2024, with LED indicators. The limit switch 76 is electrically connected with a machine electrical panel 78 for the multi-spindle machine.

In an alternative embodiment of the retrofit system the limit switch 76 can be replaced by an encoder. The encoder is an absolute 10 bit grey code encoder type which is positioned adjacent the tiring shaft and produces signals representative of the angular position and velocity of the timing shaft. The encoder is connected to a microprocessor based controller which is operative to perform the operations of the timer or send a signal to the timer to initiate its count down. Further description of the encoder and controller is contained in U.S. application Ser. No. 08/423,238 filed on Apr. 17, 1995 the content of which is incorporated herein by reference.

The electrical panel 78 houses additional components of the electrical system. The system includes a timer 80. The timer is operatively coupled with the brake clutch 72 to signal the brake clutch to engage the large worm shaft for a specified time as will be more fully described below. In the preferred embodiment of the invention the timer is an Onron Model H3CA solid state timer. The timer contains a thumb wheel switch which allows the selection of a desired time unit and a desired time to count down.

Also mounted on the electrical panel is a subpanel with a terminal strip 82. A power supply for all the electrical components of the multi-spindle machine and the retrofit system is connected to the subpanel 82. The precise wiring diagram is described below and represents the only control diagram for the operation of the preferred embodiment retrofit system.

The electrical package 77 for the retrofit system further includes a pair of push button strips 84 and 86. Both push button strips are externally mounted on the front and rear of the multi-spindle machine and are connected electrically with the machine electrical panel and the subpanel 82. The first push button strip 84 includes four push button controls. It includes a power feed stop push button 88 and a power feed start push button 90. These push buttons operate to start and stop the drive trains of the multi-spindle machine.

The first push button strip further includes a power feed jog/run switch 92. This switch acts to manually control the brake clutch 72. When the switch is in the run position the brake operates via the controls of the retrofit system 74. When in the jog position the brake is automatically applied bringing all machine components to a halt.

The first push button strip further includes a machine cycle switch 94 which includes a low and a low-high setting. When the machine cycle switch is in the low-high position the machine operates under the high-low speed control of the retrofit system 74. When the machine cycle switch is in the low position, the machine runs at low speed until switched back to the low-high setting.

The second push button strip 86 includes redundant power feed stop button 96, power feed start button 98 and power feed jog/run 100 buttons. The second push button strip 86 further includes a clutch enable switch 102 which allows the operator to throw the machine into a neutral position in which the feed clutch is disabled and the gears are operating in low speed, but are not transmitting power to the main drum shaft.

The solenoid package 103 of the retrofit system 74 includes three solenoid valves 104, 106 and 108. The solenoid values control the operation of the high speed clutch 68, feed clutch 70 and brake clutch 72 by regulating the flow of compressed air from an air supply 111 to the clutch units.

Figure 4:
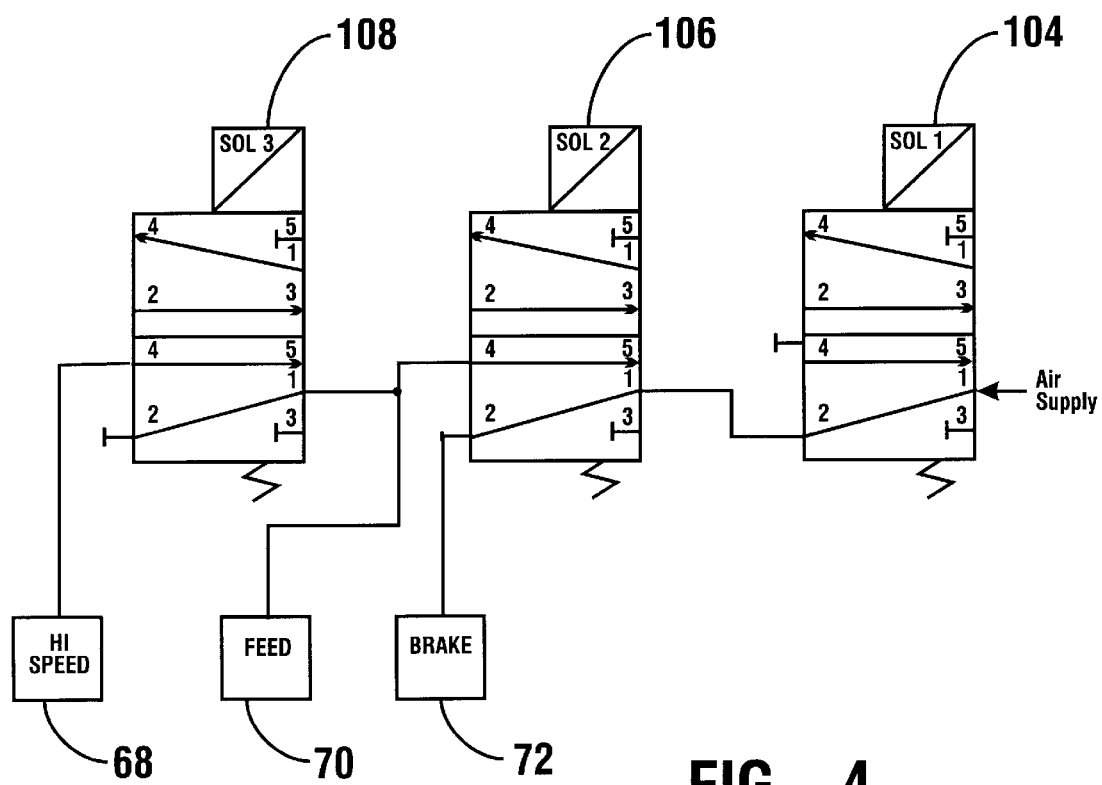
FIG. 4 shows a schematic of the solenoid valves for a retrofit system.

FIG. 4 shows a schematic of the solenoid values for the retrofit system depicting the air flow through the three solenoid valves 104, 106 and 108. The schematic indicates an energized and de-energized air flow schematic for each four port solenoid valve. The de-energized or default position is shown in the lower square and the air flow path for the energized position is shown in the upper square for each solenoid.

Referring first to solenoid valve one 104, in the de-energized state air is supplied from port one to port two where port two is linked through a conduit to inlet port one of solenoid valve two 106. In the energized state the air supply is routed from port one to a vent in port four effectively shutting off air supply to solenoid valves two and three.

In the operation of solenoid valve two 106, air is supplied from solenoid valve one at port one and in the de-energized state flows to port two and to the brake clutch 72. In the energized state air flows from port one to port four supplying the feed clutch 70 and port one of solenoid valve three 108.

In the operation of solenoid valve three 108, air is supplied from port one and in the de-energized state flows to vented port two. In the energized state flow of air from port one is routed through port four to the high speed clutch 68.

For low speed operation of the multi-spindle machine, solenoid valve one is de-energized, solenoid valve two is energized and solenoid valve three is de-energized. For high speed operation, solenoid valve one is de-energized, solenoid valve two is energized and solenoid valve three is energized. For operation of the brake, solenoid valves one and two are de-energized.

Figure 5:
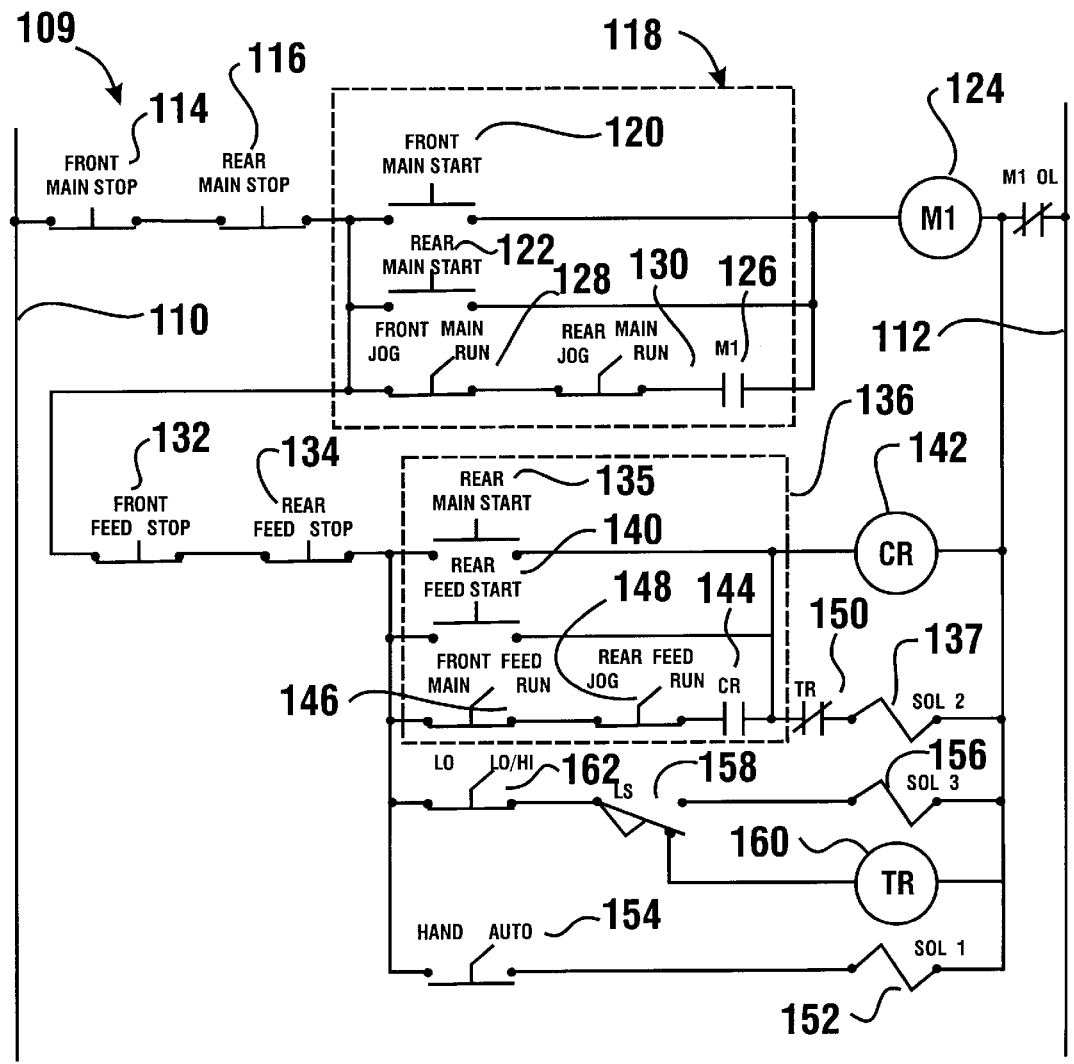
FIG. 5 shows an electrical schematic for the operation of an exemplary form of a retrofit system.

Referring now to FIG. 5 there is shown an electrical schematic 109 for the operation of the preferred form of the retrofit system. The electrical schematic shows the operation of the first and second push button strips as well as an existing rear and front push button strip which acts to start the main motor. The electrical schematic shows how power is supplied to the main motor and the solenoids of the solenoid valves. The positions of all switches are shown in the default positions. All electrical connections are made between electrical power leads 110 and 112.

Power is provided across the closed front main stop 114 and rear stop push buttons 116 to a motor start circuit 118. Motor control circuit 118 is closed by the closure of either the front main start 120 or the rear main start 122. When the front or rear main starts complete their respective circuits the motor starter control relay 124 is activated. Actuation of the motor starter relay also closes motor switch 126. Closure of motor switch 126 latches on the motor starter relay 124. The flow of electricity to motor starter relay 124 can be interrupted by the actuation of a front main jog switch 128 or the rear main jog switch 130 or the actuation of the front main stop 114 or rear main stop 116.

Power is also supplied through the front feed stop 132 and rear feed stop 134 to the solenoid two switch module 136. The actuation of either front feed start 138 or rear feed start 140 allows electricity to flow to control relay 142. The energization of control relay 142 closes control relay switch 144 allowing power to flow to solenoid two 137. Solenoid two can be de-energized by the actuation of the front feed stop 132, rear feed stop 134 or switching of the front or rear feed switches. Solenoid two 137 can also be de-energized by the timing relay switch 150 which will be described below.

Solenoid one 152 is de-energized in the default position and is energized when the hand auto switch 154 is turned to the hand position. Solenoid three 156 is also de-energized in the default position of limit switch 158. In the default position of limit switch 158 electricity flows to the timing relay 160. When the timing relay 160 is initially energized it closes timing relay switch 150 allowing electricity to flow to solenoid two for the preprogrammed time period. When the limit switch 158 switches to the solenoid three circuit allowing electricity to flow to solenoid three 156, the timing relay automatically resets. As described above, lit switch 158 is in operative connection with a timing shaft and will switch the solenoid three circuit to the timing relay circuit as the machine shifts from the high speed drive train to the low speed drive train. The machine can be kept in the low speed setting when the low to low-high switch 162 is switched to the low position, thus not allowing energization of solenoid three 156. Although the electrical schematic for the retrofit system is shown as a wiring diagram control circuit, it can alternatively be comprised of solid state components.

In operation of the preferred embodiment of the system, the electrical circuit 109 is initially in the position shown in FIG. 5. The operator first starts the main motor by depressing either the front main start button or the rear main start button 120 or 122. As described above, this allows power to flow to the motor starter relay, closing motor switch 126 and causing the motor to start.

In this start up mode the solenoid values 104, 106 and 108 are all de-energized. The de-energized states of the solenoid values leaves high speed clutch 68 disengaged, the feed clutch 70 disengaged and the brake clutch 72 engaged. Thus, the main motor drives the pulley shaft 14' via the main motor pulley 12', however the low speed drive train force is not transmitted to the main drum shaft 16' because of the disengagement of the feed clutch 70. Instead, the large worm shaft 54' is locked in stopped position by the brake clutch 72.

The operator can start the movement of the main drum shaft 16' by depressing either the front feed start 138 or rear feed start 140. Depression of either of the start buttons allows power to flow to the control relay 142 energizing solenoid value two 106. The energization of solenoid value two allows air to flow to the feed clutch 70 and releases the brake 72. Thus, the multi-spindle machine with the retrofit system allows the machine to start in low gear.

As the timing shaft 65 rotates it actuates the limit switch 76 causing the limit switch 158 to energize solenoid value three 108, putting the machine into high gear. The energization of solenoid value three allows air to flow to the high speed clutch 68. This engages high speed drive gear 44' with the pulley shaft 14', thus engaging the high speed drive train with the main drum shaft 16'.

When the timing shaft 65 rotates to disengage the limit switch 76 indicating that the machine is to shift from high speed back to low speed, the limit switch 158 switches from the solenoid three circuit to the timing relay 160 circuit allowing solenoid value three 108 to de-energize. The deactivation of the high speed clutch 68 allows the high speed drive gear 44' to operatively disengage from the pulley shaft 14'.

When the timing relay is energized, the timing relay switch 150 opens for the preset time in milliseconds, which in the preferred embodiment is one millisecond, de-energizing solenoid two. The de-energization of solenoid value two 106 releases the feed clutch 70 and applies the brake clutch 72. The application of brake clutch 72 for one millisecond slows the large worm shaft 54' from the high rotational speed to a low speed that is generally synchronized with the low speed drive train. After the timer has counted down the preset time, the timing relay switch 150 again closes allowing the re-energization of solenoid value two 106. The re-energization releases the brake clutch and again engages the feed clutch 70 allowing the low speed drive train to again drive the large worm shaft 54'.

The operation of the system of the present invention enables the high to low speed shift to be accomplished rapidly. This avoids the need to wait for machine components to slow by dissipation of the inertia before metal working operations are begun. Reducing the time it takes the machine to change from high to low enables the reduction of cycle times. The present invention further reduces wear due to whiplash of the gears during the high to low shift. This extends gear life.

It is to be understood that while the foregoing description of the retrofit system relates to its use in connection with a National Acme 7/16 RA6 multi-spindle machine, the retrofit system can be applied to decrease the cycle times associated with the shift from high to low speed for any cam operated multi-spindle machine.

Thus, the new multi-spindle machine retrofit system of the present invention achieves the above-stated objectives, eliminates difficulties encountered in the use of prior devices and systems, solves problems and attains the desirable results described herein.

In the foregoing description, certain terms have been used for brevity, clarity and understanding, however no unnecessary limitations are to be implied therefrom because such terms are for descriptive purposes and are intended to be broadly construed. Moreover, the descriptions and illustrations herein are by way of examples and the invention is not limited to the details shown and described. Further, in the following claims any feature that is described as a means for performing a function shall be construed as encompassing any means capable of performing that function and shall not be limited to the particular means shown in the foregoing description or mere equivalents.

Having described the features, discoveries and principles of the invention, the manner in which it is constructed and operated and the advantages and useful results attained; the new and useful structures, devices, elements, arrangements, parts, combinations, systems, equipment, operations and relationships are set forth in the appended claims.

I claim:

1. A retrofit system for incorporation into a multiple spindle machine, wherein the multiple spindle machine includes:
   a motor;
   a power feed train, operatively driven by the motor at either a low speed by a low speed drive train or a high speed by a high speed drive train;
   a main drum shaft and a timing shaft both driven in synchronous relation by the power feed train, wherein machining components of the multiple spindle machine are operative responsive to the main drum shaft and the timing shaft;
   wherein the retrofit system comprises:
   a high speed clutch selectively operative to connect the motor to the high speed drive train, whereby when the high speed clutch is engaged, the motor drives the high speed drive train which is operable to drive the power feed train;

a feed clutch operative to selectively connect the power feed train to either the low speed drive train or the high speed drive train, whereby when the feed clutch is engaged, the power feed train is driven by either the low speed drive train or the high speed drive train, whereby when the feed clutch is disengaged the power feed train does not receive power from the motor;

a brake clutch, wherein the brake clutch is selectively operative to slow the speed of the power feed train; and an electrical control system in operative connection with the high speed clutch, feed clutch and brake clutch, wherein the control system is operative to cause the high speed clutch and the feed clutch to be engaged, whereby the machining components are operated at a high speed, and wherein the control system is further operative to cause the high speed clutch to be disengaged and the feed clutch to be disengaged while the brake clutch is engaged to slow the rotational speed of the power feed train from the high speed.

2. A retrofit system for incorporation into a multiple spindle machine, wherein the multiple spindle machine includes:

a motor;

a power feed train, operatively driven by the motor at either a low speed by a low speed drive train or a high speed by a high speed drive train;

a main drum shaft and a timing shaft both driven in synchronous relation by the power feed train, wherein machining components of the multiple spindle machine are operative responsive to the main drum shaft and the timing shaft;

wherein the retrofit system comprises:

a high speed clutch selectively operative to connect the motor to the high speed drive train, whereby when the high speed clutch is engaged, the motor drives the high speed drive train which is operable to drive the power feed train;

a feed clutch operative to selectively connect the power feed train to either the low speed drive train or the high speed drive train, whereby when the feed clutch is engaged, the power feed train is driven by either the low speed drive train or the high speed drive train, whereby when the feed clutch is disengaged the power feed train does not receive power from the motor;

a brake clutch, wherein the brake clutch is selectively operative to slow the speed of the power feed train;

an electrical control system in operative connection with the high speed clutch, feed clutch and brake clutch, wherein the control system is operative to cause the high speed clutch and the feed clutch to be engaged, whereby the machining components are operated at a high speed, and wherein the control system is further operative to cause the high speed clutch to be disengaged and the feed clutch to be disengaged while the brake clutch is engaged to slow the rotational speed of the power feed train from the high speed; and a timer, wherein the timer is operable to count down a preset time interval, wherein the preset time interval represents the time the brake clutch is engaged when the machining components are switched from the high speed to the low speed.

3. The retrofit system of claim 1, further comprising means for determining when said machining components speed is to be switched from said high speed to said low speed.

4. The retrofit system of claim 3, wherein said determining means comprises means for sensing the rotational position of said timing shaft.

5. The retrofit system of claim 4, wherein said sensing means comprise a switch operatively actuated by said timing shaft.

6. A retrofit system for incorporation into a multiple spindle machine, wherein the multiple spindle machine includes:

a motor;

a power feed train, operatively driven by the motor at either a low speed by a low speed drive train or a high speed by a high speed drive train;

a main drum shaft and a timing shaft both driven in synchronous relation by the power feed train, wherein machining components of the multiple spindle machine are operative responsive to the main drum shaft and the timing shaft;

wherein the retrofit system comprises:

a high speed clutch selectively operative to connect the motor to the high speed drive train, whereby when the high speed clutch is engaged, the motor drives the high speed drive train which is operable to drive the power feed train;

a feed clutch operative to selectively connect the power feed train to either the low speed drive train or the high speed drive train, whereby when the feed clutch is engaged, the power feed train is driven by either the low speed drive train or the high speed drive train, whereby when the feed clutch is disengaged the power feed train does not receive power from the motor;

a brake clutch, wherein the brake clutch is selectively operative to slow the speed of the power feed train;

an electrical control system in operative connection with the high speed clutch, feed clutch and brake clutch, wherein the control system is operative to cause the high speed clutch and the feed clutch to be engaged, whereby the machining components are operated at a high speed, and wherein the control system is further operative to cause the high speed clutch to be disengaged and the feed clutch to be disengaged while the brake clutch is engaged to slow the rotational speed of the power feed train from the high speed;

means for determining when the machining components speed is to be switched from the high speed to the low speed;

wherein the determining means comprises means for sensing the rotational position of the timing shaft; and wherein the sensing means comprise an encoder positioned adjacent the timing shaft to continuously sense the rotational position of the timing shaft.

7. A retrofit system for incorporation into a multiple spindle machine, wherein the multiple spindle machine includes:

a motor;

a power feed train, operatively driven by the motor at either a low speed by a low speed drive train or a high speed by a high speed drive train;

a main drum shaft and a timing shaft both driven in synchronous relation by the power feed train, wherein machining components of the multiple spindle machine are operative responsive to the main drum shaft and the timing shaft;

wherein the retrofit system comprises:

a high speed clutch selectively operative to connect the motor to the high speed drive train, whereby when the high speed clutch is engaged, the motor drives the high speed drive train which is operable to drive the power feed train;

a feed clutch operative to selectively connect the power feed train to either the low speed drive train or the high speed drive train, whereby when the feed clutch is engaged, the power feed train is driven by either the low speed drive train or the high speed drive train, whereby when the feed clutch is disengaged the power feed train does not receive power from the motor;

a brake clutch, wherein the brake clutch is selectively operative to slow the speed of the power feed train;

an electrical control system in operative connection with the high speed clutch, feed clutch and brake clutch, wherein the control system is operative to cause the high speed clutch and the feed clutch to be engaged, whereby the machining components are operated at a high speed, and wherein the control system is further operative to cause the high speed clutch to be disengaged and the feed clutch to be disengaged while the brake clutch is engaged to slow the rotational speed of the power feed train from the high speed;

means for determining when the machining components speed is to be switched from the high speed to the low speed; and a timer, wherein the timer is operable to count down a preset time interval, wherein the preset time interval represents the time the brake clutch is engaged when the machining components are switched from the high speed to the low speed, wherein the count down is initiated by a signal from the determining means.

8. The retrofit system of claim 2, further comprising a controller, wherein said controller is operative to initiate said count down of said timer, and to send signals to said high speed clutch, said feed clutch when said machining components speed are to be switched from said high speed to a low speed, and to said feed clutch and to said brake clutch when said count down is completed.

9. The retrofit system of claim 1, wherein said high speed clutch, said feed clutch and said brake clutch are electrically controlled and pneumatically actuated.

10. The retrofit system of claim 9, wherein the high speed clutch, the feed clutch, and the brake clutch comprise multiple friction disks.

11. A retrofit system for incorporation into a multiple spindle machine, wherein the multiple spindle machine includes:

a motor;

a power feed train, operatively driven by the motor at either a low speed by a low speed drive train or a high speed by a high speed drive train;

a main drum shaft and a timing shaft both driven in synchronous relation by the power feed train, wherein machining components of the multiple spindle machine are operative responsive to the main drum shaft and the timing shaft;

wherein the retrofit system comprises:

a high speed clutch selectively operative to connect the motor to the high speed drive train, whereby when the high speed clutch is engaged, the motor drives the high speed drive train which is operable to drive the power feed train;

a feed clutch operative to selectively connect the power feed train to either the low speed drive train or the high speed drive train, whereby when the feed clutch is engaged, the power feed train is driven by either the low speed drive train or the high speed drive train, whereby when the feed clutch is disengaged the power feed train does not receive power from the motor;

a brake clutch, wherein the brake clutch is selectively operative to slow the speed of the power feed train;

an electrical control system in operative connection with the high speed clutch, feed clutch and brake clutch, wherein the control system is operative to cause the high speed clutch and the feed clutch to be engaged, whereby the machining components are operated at a high speed, and wherein the control system is further operative to cause the high speed clutch to be disengaged and the feed clutch to be disengaged while the brake clutch is engaged to slow the rotational speed of the power feed train from the high speed;

wherein the high speed clutch, the feed clutch and the brake clutch are electrically controlled and pneumatically actuated;

wherein the high speed clutch the feed clutch and the brake clutch comprise multiple friction disks; and three solenoid valves, wherein an air supply for the actuation of the high speed clutch, the feed clutch, and the brake clutch is routed through the solenoid valves.

12. The retrofit system of claim 11, further comprising a controller, wherein said controller is operative to receive manual inputs, wherein said controller is operative to send signals to said solenoid valves for the operation of said high speed clutch, said feed clutch, and said brake clutch.

13. The retrofit system of claim 12, further comprising a timer, wherein said timer is operable to count down a preset time interval, wherein said timer is operative to send a signal to said controller which then sends signals to said solenoid valves.

14. The retrofit system of claim 13, further comprising a limit switch, wherein said limit switch is operative to determine the rotational position of said timing shaft, wherein said limit switch is operative to send a signal to said timer when said limit switch senses a predetermined rotational position of said timing shaft.

15. The retrofit system of claim 13, further comprising an encoder, wherein said encoder is operative to determine the rotational position of said timing shaft, wherein said encoder is operative to send a signal to said controller corresponding to the rotational position of said timing shaft.

16. A retrofit system for incorporation into a multiple spindle machine, wherein the multiple spindle machine includes:

a motor;

a first gear, operatively driven by the motor at either a low speed by a low speed drive train or a high speed by a high speed drive train;

a second gear, wherein the second gear is rotated by the first gear;

a shaft, wherein the shaft is rotated by the second gear, wherein machining components of the multiple spindle machine are operatively driven by the shaft;

wherein the retrofit system comprises:

a high speed clutch selectively operative to connect the motor to the high speed drive train, whereby when the high speed clutch is engaged the motor drives the high speed drive train which operates to rotate the first gear;

a feed clutch operative to selectively connect the shaft to the second gear, whereby when the feed clutch is engaged the shaft is driven by the second gear, whereby when the feed clutch is disengaged the shaft does not receive power from the second gear;

a brake clutch, wherein the brake clutch is selectively operative to slow the speed of the shaft;

a timer, wherein the timer is operable to count down a preset time interval;

wherein the preset time interval represents the time the brake clutch is engaged when the machining components are switched from the high speed to the low speed;

an electrical control system in operative connection with the high speed clutch, feed clutch and brake clutch, wherein the control system is operative to cause the high speed clutch and the feed clutch to be engaged, whereby the machining components are operated at a high speed, and wherein the control system is further operative to cause the high speed clutch to be disengaged and the feed clutch to be disengaged while the brake clutch is engaged to slow the rotational speed of the power feed train from the high speed.

17. A method for reducing wear on the gears of a multiple spindle machine, the multiple spindle machine comprising: a motor; a first gear, operatively driven by the motor at either a low speed by a low speed drive train or a high speed by a high speed drive train; a second gear, wherein the second gear is rotated by the first gear; a shaft, wherein the shaft is rotated by the second gear; a timing shaft, wherein machining components of the multiple spindle machine are sequentially operated in coordination with the rotation of the timing shaft, wherein the machining components are operatively driven by the shaft; the method comprising: installing a high speed clutch into the multiple spindle machine in selectively operative connection with the motor and the high speed drive train, whereby when the high speed clutch is engaged the motor drives the high speed drive train which is operable to rotate the first gear; installing a feed clutch into the multiple spindle machine in operative connection with the shaft and the second gear, wherein the feed clutch is operative to selectively connect the shaft to the second gear, whereby when the feed clutch is engaged the shaft is driven by the second gear, whereby when the feed clutch is disengaged the shaft does not receive power from the second gear;

installing a brake clurch into the multiple spindle machine in selectively operative connection with the shaft, wherein the brake clutch is operative to slow the speed of the shaft; and installing an electrical control system in operative connection with the high speed clutch, feed clutch and brake clutch, wherein the control system is operative to cause the high speed clutch and the feed clutch to be engaged, whereby the machining components are operated at a high speed, and wherein the control system is further operative to cause the high speed clutch to be disengaged and the feed clutch to be disengaged while the brake clutch is engaged to slow the rotational speed of the power feed train from the high speed.

18. The method according to claim 17, further comprising the steps of installing a timer, wherein said timer is operative to count down a preset time interval, initiating said count down when said timing shaft reaches a predetermined rotational position, wherein said predetermined rotational position corresponds to a time where said machining components are switched from a high speed to a low speed.

19. A method for reducing wear on the gears of a multiple spindle machine, the multiple spindle machine comprising:

a motor;

a first gear, operatively driven by the motor at either a low speed by a low speed drive train or a high speed by a high speed drive train;

a second gear, wherein the second gear is rotated by the first gear;

a shaft, wherein the shaft is rotated by the second gear;

a timing shaft, wherein machining components of the multiple spindle machine are sequentially operated in coordination with the rotation of the timing shaft, wherein the machining components are operatively driven by the shaft;

the method comprising:

installing a high speed clutch into the multiple spindle machine in selectively operative connection with the motor and the high speed drive train, whereby when the high speed clutch is engaged the motor drives the high speed drive train which is operable to rotate the first gear;

installing a feed clutch into the multiple spindle machine in operative connection with the shaft and the second gear, wherein the feed clutch is operative to selectively connect the shaft to the second gear, whereby when the feed clutch is engaged the shaft is driven by the second gear, whereby when the feed clutch is disengaged the shaft does not receive power from the second gear;

installing a brake clutch into the multiple spindle machine in selectively operative connection with the shaft, wherein the brake clutch is operative to slow the speed of the shaft;

installing an electrical control system in operative connection with the high speed clutch, feed clutch and brake clutch, wherein the control system is operative to cause the high speed clutch and the feed clutch to be engaged, whereby the machining components are operated at a high speed, and wherein the control system is further operative to cause the high speed clutch to be disengaged and the feed clutch to be disengaged while the brake clutch is engaged to slow the rotational speed of the power feed train from the high speed;

and further comprising installing a timer, wherein the timer is operative to count down a preset time interval, initiating the count down when the timing shaft reaches a predetermined rotational position, wherein the predetermined rotational position corresponds to a time where the machining components are switched from a high speed to a low speed;

and further comprising:

disengaging the high speed clutch when the timing shaft reaches a predetermined rotational position;

disengaging the feed clutch when the timing shaft reaches a predetermined rotational position;

engaging the brake clutch when the timing shaft reaches a predetermined rotational position for the preset time interval.

20. The method according to claim 19, further comprising the step of:

reengaging said feed clutch after said preset time interval, whereby said machining components are operated at said low speed.

* * * * *